US007121141B2

(12) United States Patent
McNeil

(10) Patent No.: US 7,121,141 B2

(45) Date of Patent: Oct. 17, 2006

(54) Z-AXIS ACCELEROMETER WITH AT LEAST TWO GAP SIZES AND TRAVEL STOPS DISPOSED OUTSIDE AN ACTIVE CAPACITOR AREA

(75) Inventor: Andrew C. McNeil, Scottsdale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/046,596

(22) Filed: Jan. 28, 2005

(65) Prior Publication Data

US 2006/0169043 A1 Aug. 3, 2006

(51) Int. Cl.
*G01P 15/125* (2006.01)
*G01P 15/00* (2006.01)
*G01P 15/10* (2006.01)

(52) U.S. Cl. .............................. 73/514.32; 73/514.01; 73/514.15

(58) Field of Classification Search ............. 73/514.01, 73/514.02, 514.29, 514.32, 514.36, 514.38, 73/514.16, 514.18, 510, 514.15; 361/280
See application file for complete search history.

(56) References Cited

U.S. PATENT DOCUMENTS 4,736,629 A * 4/1988 Cole ....................... 73/514.32
4,930,043 A * 5/1990 Wiegand ................. 73/514.18
5,181,156 A * 1/1993 Gutteridge et al. ...... 361/283.1
5,581,035 A * 12/1996 Greiff ...................... 73/514.32
5,587,518 A 12/1996 Stevenson et al.
5,731,520 A 3/1998 Stevenson et al.
5,900,550 A * 5/1999 Menzel .................... 73/514.32
5,905,203 A * 5/1999 Flach et al. ............. 73/514.32
6,841,992 B1 * 1/2005 Yue et al. ................... 324/162
6,845,680 B1 * 1/2005 Brent et al. ................... 73/866
6,955,086 B1 * 10/2005 Yoshikawa et al. ...... 73/514.32

* cited by examiner

*Primary Examiner*—Helen Kwok
(74) *Attorney, Agent, or Firm*—Ingrassia, Fisher & Lorenz

(57) ABSTRACT

An accelerometer includes a pair of conductive plates fixedly mounted on a substrate surface, a structure coupled to the substrate surface and suspended above the conductive plates, and at least one protective shield mounted on the substrate surface. The structure includes two regions of differing total moments disposed above a respective conductive plate and separated by a flexure axis about which the structure rotates during an acceleration normal to the substrate, each region having a substantially planar outer surface and an inner surface having a first corrugation formed thereon. For each of the two regions, an inner gap exists between the first corrugation and an opposing conductive plate, and an outer gap exists between the substantially planar outer surface and the opposing conductive plate, the outer gap being larger than the inner gap. The at least one protective shield is placed apart from either of the conductive plates.

19 Claims, 1 Drawing Sheet

Z-AXIS ACCELEROMETER WITH AT LEAST TWO GAP SIZES AND TRAVEL STOPS DISPOSED OUTSIDE AN ACTIVE CAPACITOR AREA

TECHNICAL FIELD

The present invention generally relates to microelectromechanical system (MEMS) devices and, more particularly, to a MEMS device that includes an accelerometer having a teeter-totter structure.

BACKGROUND

Many devices and systems include various numbers and types of sensors that perform various monitoring and/or control functions. Advancements in micromachining and other microfabrication techniques and associated processes have enabled manufacture of a wide variety of microelectromechanical (MEMS) devices. In recent years, many of the sensors that are used to perform monitoring and/or control functions have been implemented into MEMS devices.

One particular type of MEMS sensor that is used in various applications is an accelerometer. Typically, a MEMS accelerometer includes, among other component parts, a proof mass that is resiliently suspended by one or more suspension springs. The proof mass moves when the MEMS accelerometer experiences acceleration. The motion of the proof mass may then be converted into an electrical signal having a parameter magnitude (e.g., voltage, current, frequency, etc.) that is proportional to the acceleration.

Another type of MEMS accelerometer that is used to sense acceleration is commonly referred to as a teeter-totter capacitive acceleration transducer, or a "teeter totter accelerometer." A typical teeter totter accelerometer includes an unbalanced proof mass suspended over a substrate using a fulcrum or other axis. The proof mass forms first and second capacitors with a first and a second conductive electrode, both of which are formed on the substrate. During an acceleration perpendicular to the substrate the proof mass tilts to a degree that is proportional to the acceleration, and the gap between the proof mass increases on one side of the axis, and decreases on the opposite side of the axis. The capacitances of the first and second capacitors change in opposite directions, and the capacitance changes are detected and used to determine the direction and magnitude of the acceleration.

Teeter-totter accelerometers are generally simple and cost-efficient to manufacture. However, since the proof mass tilts rather than moving in a uniform manner with respect to an opposing electrode, the change in the average gap size between the proof mass and the opposing electrode is relatively small. The small change in average gap size sometimes translates to a suboptimal capacitance change for some purposes. Since the change in the average gap size is relatively small, teeter-totter accelerometers may not be adequately sensitive to small accelerations. Further, the base capacitance (capacitance under zero acceleration) is often lower than desired, as making the plates larger results in larger die area and hence higher production costs.

Also, if a MEMS device such as one of the above-described MEMS accelerometers experiences a relatively high acceleration or is exposed to a relatively high force, the proof mass can move beyond a desired distance. In some instances, such movement can potentially damage the MEMS device. Moreover, the MEMS device can exhibit unstable behavior if the proof mass and/or other portions of the MEMS device travel too far when a voltage is supplied to the MEMS device. Thus, many MEMS devices include one or more types of travel stops or motion limiters that are arranged to limit the movement of the proof mass and/or other portions of the MEMS device.

Although presently-known devices and methods for limiting the travel of MEMS device components are generally safe, reliable, and robust, these devices and methods do suffer certain drawbacks. For example, some capacitor structures include integral travel stops within an active capacitor region. Some typical travel stops include corrugations or dimples that are formed with or on a proof mass, and arranged to fit between the proof mass and another capacitor plate to prevent the two masses from making electrical or mechanical contact. Other common travel stops are not part of the proof mass, but are separate structures that are positioned in an active area between a proof mass and a capacitor plate. Because the travel stops are located in an active area, they include a dielectric or other nonconductive layer that contacts the proof mass to impede the proof mass motion. Over time, the nonconductive layer can wear or lose its ability to isolate the proof mass and the capacitor plate, thereby shortening the functional life of the MEMS device.

Accordingly, it is desirable to provide a MEMS accelerometer that is highly sensitive, has a high base capacitance, and also consumes minimum die area. In addition, it is desirable to provide a MEMS accelerometer that is not prone to damage resulting from impacts involving the functional components. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to a first embodiment of the invention, an accelerometer comprises a substrate having a surface, a pair of conductive plates fixedly mounted on the substrate surface, a structure that is coupled to the substrate surface and suspended above the conductive plates, and at least one protective shield mounted on the substrate surface. The structure has first and second regions of differing mass that are each disposed above a respective conductive plate and are separated by a flexure axis about which the structure rotates during an acceleration normal to the substrate. The at least one protective shield is positioned apart from either of the first and second conductive plates, to limit rotation of the structure and thereby prevent the structure from contacting one of the conductive plates.

According to a second embodiment of the invention, an accelerometer comprises a substrate having a surface, a pair of conductive plates fixedly mounted on the substrate surface, and a structure that is coupled to the substrate surface and suspended above the conductive plates. The structure comprises first and second regions of differing total moments disposed above a respective conductive plate and separated by a flexure axis about which the structure rotates during an acceleration normal to the substrate, each region having a substantially planar outer surface and an inner surface having a first corrugation formed thereon. For each of the first and second regions, an inner gap exists between the first corrugation and an opposing conductive plate, and an outer gap exists between the substantially planar outer surface and the opposing conductive plate, the outer gap being larger than the inner gap.

According to yet another embodiment of the invention, an accelerometer comprises a substrate having a surface, a pair of conductive plates fixedly mounted on the substrate surface, a structure coupled to the substrate surface and including the corrugated portions as described above with reference to the second embodiment, and the protective shields as described above with respect to the first embodiment.

Figure 1:
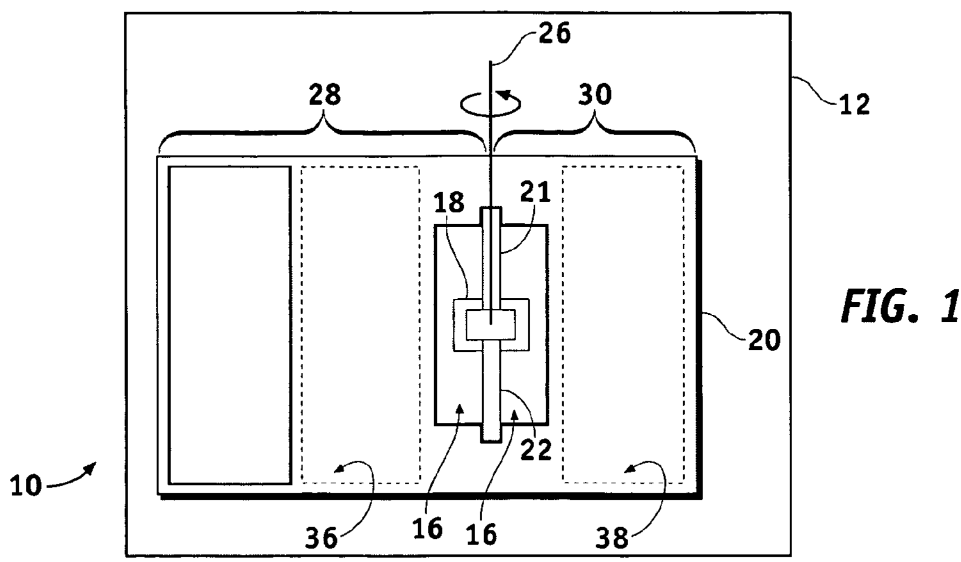
FIG. 1 is a top view of an exemplary teeter-totter accelerometer according to an embodiment of the invention.

A top view of an exemplary teeter-totter accelerometer is illustrated in FIG. 1. The accelerometer 10 includes a movable plate, hereinafter referred to as a proof mass 20, that is mounted above a substrate 12 by a mounting system. An internal area of the proof mass 20 is removed to form an opening 16. The mounting system includes a pedestal 18 and torsion bars 21, 22 that are positioned within the opening 16, the torsion bars 21, 22 extending in opposite directions from the pedestal 18 to the proof mass 20. The proof mass 20, pedestal 28, and torsion bars 21, 22 are all fabricated from a conductive material such as polysilicon. The torsion bars 21, 22 define a flexure axis 26 about which the proof mass 20 can rotate with respect to the pedestal 18 and the substrate 12. More particularly, the torsion bars 21, 22 provide an axially compliant suspension that allows the proof mass 20 to rotate about the flexure axis 26. The paired torsion bars are just one of many possible suspension mechanisms. The proof mass 20 and the substrate upper surface 24 are substantially planar, and the mounting system mounts the proof mass 20 so that it is spaced above and parallel to the upper surface 24 in the absence of acceleration normal to the upper surface 24.

The flexure axis 26 divides the proof mass 20 into a first section 28 on one side of the flexure axis 26 and a second section 30 on the opposite side of the flexure axis 26. The proof mass 20 is constructed such that a total moment (mass times moment arm) of the first section 28 about the flexure axis 26 is less than the total moment of the second section 30 about the flexure axis 26. One way to provide these total moment differences is to offset the center of mass of the proof mass 20 from the flexure axis 26. Therefore, in response to acceleration normal to the upper surface 24, the proof mass 20 tends to rotate about the flexure axis 26, the degree of rotation being approximately proportional to the acceleration magnitude, and the direction of rotation corresponding to the acceleration direction.

The substrate 12 includes a non-illustrated semiconductor layer that is covered by one or more non-illustrated insulation layers. The semiconductor layer is typically a silicon wafer upon which electronics associated with the accelerometer 10 may, in some cases, also be fabricated using conventional manufacturing technology. The insulating layer may include glass, silicon dioxide, silicon nitride, or any other compatible material. A conductive electrode or fixed plate 36 is formed in the semiconductor layer and is positioned underlying a portion of the proof mass first section 28. A conductive fixed plate 38 is also formed in the semiconductor layer and underlies a portion of the proof mass second section 30. The fixed plates 36, 38 are preferably equal to one another in size and shape, and are preferably positioned symmetrically with respect to the flexure axis 26.

Non-illustrated conductors are formed in the substrate to provide separate electrical connections to the fixed plates 36, 38 and the proof mass 20. The fixed plates 26, 28 are formed from a conductive material such as polysilicon, and can be formed at the same time as the respective conductors if the same materials are chosen for such components. As will be subsequently described in detail, the paired fixed plate 36 and proof mass first section 28 form a first capacitor, and the paired fixed plate 38 and proof mass second section 30 form a second capacitor. When the proof mass 20 rotates about the flexure axis 26 in response to acceleration, the capacitances of the first and second capacitors change in opposite directions, and the capacitance changes are detected and used to determine the direction and magnitude of the acceleration.

The accelerometer sensitivity is adjustable over a wide range by changing the geometry of the proof mass 20 to vary its mass and the moment arms of the first and second sections 28, 30 about the flexure axis 26. The sensitivity may also be varied by adjusting the dimensions, and therefore the spring constants, of the torsion bars 20, 22. Further, by achieving a center of inertial mass in the plan of the flexure axis 26, the accelerometer is virtually insensitive to accelerations parallel to the upper surface 24.

In order to measure capacitance, a voltage difference is applied between the capacitor plates. The applied voltage causes an electrostatic force of attraction between the plates. If the force causes a deflection that causes in a change in capacitance, the process of measuring the capacitance disturbs the value of capacitance being measured. If the applied voltage is large enough and the capacitor spacing is sufficiently small, the resulting force will overcome the restoring force of the mounting system, causing the capacitor plates to pull together and thereby rendering the device inoperative. This is one consideration that can set the upper limit for sensitivity that can be achieved. The teeter-totter design has a canceling effect that reduces or eliminates any perturbing deflections caused by the measuring voltages. More particularly, the fixed plates 36, 38 are arranged in a manner whereby the torque around the flexure axis 26 caused by the voltage applied to the fixed plate 36 tends to cancel the torque produced by the voltage on the fixed plate 38. Another benefit of the teeter-totter having two variable capacitors located on opposite sides of a flexure axis is that the differential capacitance provides an output that is twice as sensitive as compared to a device using a single variable capacitor and a fixed capacitor. Further, in an embodiment having each capacitor composed of plates formed from an identical composition such as polysilicon, thermal coefficients of the capacitors will be essentially identical, thereby substantially eliminating temperature sensitivity.

Figure 2A:
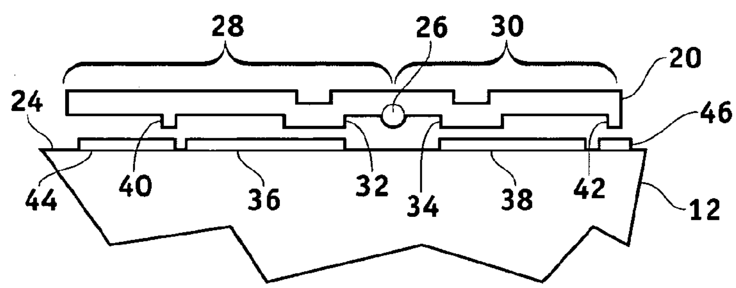
FIG. 2A is a side view of an exemplary teeter-totter accelerometer having two gap sizes in active areas opposing conductive regions, and further having stops on the proof mass and a stop shield on the underlying substrate according to an embodiment of the invention.
Figure 2B:
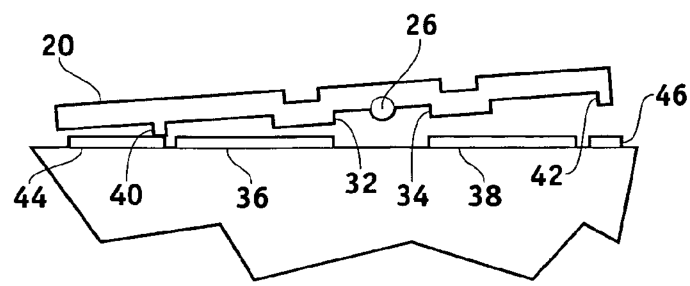
FIG. 2B is a side view of the teeter-totter accelerometer illustrated in FIG. 2A, with the proof mass tilted until the stop on the proof mass contacts the stop shield.

As mentioned previously, since the proof mass 20 tilts rather than moving in a uniform manner with respect to the opposing fixed plates 36, 38, the change in the average gap size between the proof mass 20 and the fixed plates 36, 38 is relatively small. The small change in average gap size may translate to a suboptimal sensitivity for some purposes. The exemplary teeter-totter construction illustrated in FIGS. 2A and 2B provides increased base capacitance and increased capacitance changes during acceleration, and also increases the capacitor sensitivity by reducing the gap sizes in areas close to the flexure axis 26. Corrugations 32, 34 produce smaller gaps in "inboard" (closer to flexure 26) regions of fixed plates 36, 38. Larger gaps between the proof mass 20 and the fixed plates 36, 38 are outwardly disposed (farther from flexure 26) with respect to the small gaps. FIG. 2A is a side view of the exemplary teeter-totter construction with the proof mass 26 parallel to the substrate top surface 24, and FIG. 2B illustrates the teeter-totter accelerometer with the proof mass tilted due to acceleration normal to the substrate top surface 24. The smaller gap brings about a larger proportional change in gap size near the proof mass flexure axis 26 during acceleration when compared with a conventional teeter-totter accelerometer having a uniform gap size. Further, the larger proportional change in gap size near the proof mass flexure axis 26 translates to a larger overall change in gap size during acceleration. The use of the smaller gap also produces higher base capacitance values.

Figure 3:
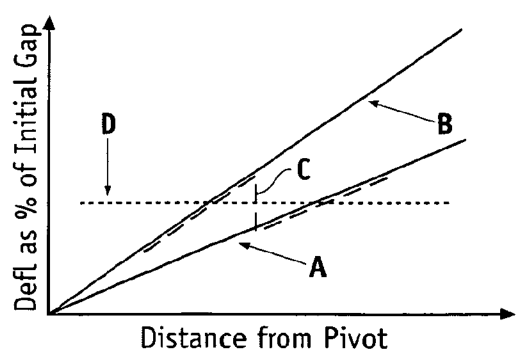
FIG. 3 is a graph comparing the sensitivities of common one-gap teeter-totter accelerometers and an exemplary inventive teeter-totter accelerometer.

Although the accelerometer illustrated in FIGS. 2A and 2B represents a two-gap construction, additional gaps levels can be employed to achieve even more uniform change in gap size across each capacitor in a teeter-totter accelerometer. By adding increasingly smaller corrugations toward the proof mass 20 outer edges, the proportional gap change during an acceleration becomes more uniform across the proof mass 20. FIG. 3 is a graph of proof mass deflection as a percentage of the initial gap size during an acceleration vs. the proof mass distance from the flexure axis. The horizontal line D represents an ideal uniform deflection across the entire proof mass. However, deflection can not be entirely uniform for an accelerometer having a pivoting proof mass, such as a teeter-totter accelerometer. Curves A and B represent the approximately linear [deflection %]/[distance from flexure axis] relationships for proof masses having a conventional initial gap size and a smaller initial gap size, respectively. Curve C illustrates a hybrid of curves A and B due to an accelerometer construction having both the conventional initial gap size on the outer portion of a proof mass, and the smaller initial gap size on the inner portion of the proof mass. It can be seen from nonlinear curve C how more than two initial gap sizes, with the initial gap sizes increasing as the proof mass distance from the flexure axis increases, will produce a curve that approaches the horizontal line D; the deflection along the proof mass becomes more uniform with each additional gap formed by increasingly smaller corrugations in the proof mass. Consequently, an exemplary construction includes more than two gap sizes between the proof mass 20 and the fixed plates 36, 38 on each side of the flexure axis 26.

Returning now to FIGS. 2A and 2B, the proof mass travel stop features will be described next. Shields 44, 46 are formed on the substrate upper surface 24, and are positioned outside the active capacitor areas. Because the shields 44, 46 are formed away from the fixed plates 36, 38, the shields do not affect the base capacitance or the device sensitivity. The shields 44, 46 are positioned to stop further rotation of the proof mass if an acceleration is large enough to rotate the proof mass to the point at which it contacts one of the shields 44, 46. The proof mass is stopped before one of the fixed plates 36, 38 contacts the proof mass.

The shields 44, 46 are formed from a conductive material such as polysilicon. During an exemplary processing method, the shields are formed from the same material as the fixed plates 36, 38. Such a method is advantageous because the shield and plate material is deposited directly on the substrate, followed by selective etching to pattern the shields 44, 46 and the fixed plates 36, 38 simultaneously.

In one exemplary embodiment, the shields 44, 46 are positioned closer to the proof mass outer edge than the fixed plates 36, 38, and are tall enough to cause the proof mass 20 to naturally contact one of the shields 44, 46 before it can contact one of the fixed plates 36, 38 and cause a short. In another exemplary embodiment, the proof mass 20 includes stops 40, 42, each of which opposes and protrudes toward a respective shield 44, 46 to ensure that a short does not occur. Since the shields 44, 46 are positioned apart from the fixed plates 36, 38 the stops 40, 42 are likewise disposed outside of any active capacitor area in order to be able to contact the shields 44, 46 when the proof mass 20 rotates.

The stops 40, 42 are formed from the same conductive material as the remainder of the proof mass 20, including the corrugations 32, 34. During an exemplary processing method, the stops 40, 42 are formed from the same material as the corrugations 32, 34 by depositing the stop material and corrugation material over the previously formed proof mass 20, followed by selective etching to pattern the shields stops 40, 42 and the corrugations 32, 34 simultaneously. It is therefore convenient to form stops 40, 42 and the corrugations 32, 34 with equal lengths.

Each gap between the proof mass 20 and one of the shields 44, 46 is adjusted to be closed, as depicted in FIG. 2B, before the proof mass 20 can contact one of the fixed plates 36, 38. For instance, if the accelerometer 10 is constructed with one of the shields 44 positioned to contact the proof mass 20 very near the fixed plate 36, the gap between the shield 44 and the proof mass 20 will be relatively small. However, the gap between the shield 44 and the proof mass 20 can increase as the point of contact between the shield 44 and the proof mass 20 is brought farther from the fixed plate 36 and closer to the proof mass outer portion, and still prevent the proof mass 20 from contacting the fixed plate 36 during an acceleration. Thus, the entire travel stop assembly is arranged to preserve the functional life of the accelerometer by preventing collision-related damage to the active capacitor areas.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An accelerometer, comprising:

a substrate having a surface;

a pair of conductive capacitor plates fixedly mounted on the substrate surface;

a structure coupled to the substrate surface, and suspended above the conductive capacitor plates, the structure having first and second regions of differing mass that are each disposed above a respective conductive capacitor plate to form a capacitor therewith, and are separated by a flexure axis about which the structure rotates during an acceleration normal to the substrate; and at least one protective shield mounted on the substrate surface, and positioned entirely laterally apart from either of the conductive capacitor plates, and further positioned to limit rotation of the structure and thereby prevent the structure from contacting one of the conductive capacitor plates.

2. The accelerometer of claim 1, wherein the at least one protective shield is a pair of the protective shields mounted on the substrate surface, a first protective shield from the pair being positioned to oppose the structure first region, and a second protective shield from the pair being positioned to oppose the structure second region.

3. The accelerometer according to claim 1, wherein the structure further comprises at least one stop that opposes, and protrudes toward, the protective shield.

4. The accelerometer according to claim 2, wherein the structure further comprises a first stop that opposes, and protrudes toward, the first protective shield, and a second stop that opposes, and protrudes toward, the second protective shield.

5. The accelerometer according to claim 1, wherein the at least one protective shield and the pair of conductive plates are formed from the same material.

6. The accelerometer according to claim 5, wherein the at least one protective shield and the pair of conductive plates are formed directly on the substrate surface.

7. An accelerometer, comprising:

a substrate having a surface;

a pair of conductive plates fixedly mounted on the substrate surface; and a structure coupled to the substrate surface, and suspended above the conductive plates, the structure comprising:

first and second regions of differing total moments disposed above a respective conductive plate and separated by a flexure axis about which the structure rotates during an acceleration normal to the substrate, each region having a substantially planar outer surface and an inner surface having a first corrugation formed parallel to the flexure axis formed thereon, whereby for each of the first and second regions, an inner gap exists between the first corrugation and an opposing conductive plat, and an outer gap exists between the substantially planar outer surface and the opposing conductive plate, the outer gap being larger than the inner gap.

8. The accelerometer according to claim 7, wherein each of the first and second regions further comprises at least one additional corrugation that is formed between the first corrugation and the outer surface, whereby between each additional corrugation and the opposing conductive plate an intermediate gap exists, each intermediate gap being larger than the inner gap and smaller than the outer gap.

9. The accelerometer according to claim 8, wherein from the inner gap to the outer gap, each successive intermediate gap increases in size.

10. The accelerometer according to claim 7, wherein the structure further comprises at least one stop that protrudes a substrate surface area that does not have a conductive plate formed thereon.

11. The accelerometer according to claim 7, wherein the structure further comprises first and second stops that protrude toward respective substrate surface areas that do have a conductive plate formed thereon.

12. An accelerometer, comprising:

a substrate having a surface;

a pair of conductive capacitor plates fixedly mounted on the substrate surface;

a structure coupled to the substrate surface, and suspended above the conductive capacitor plates to form capacitors therewith the structure comprising:

first and second regions of differing total moments disposed above a respective conductive capacitor plate and separated by a flexure axis about which the structure rotates during an acceleration normal to the substrate, each region having a substantially planar outer surface and an inner surface having a first corrugation formed parallel to the flexure axis formed thereon, whereby for each of the first and second regions, an inner gap exists between the first corrugation and an opposing conductive capacitor plate, and an outer gap exists between the substantially planar outer surface and the opposing conductive capacitor plate, the outer gap being larger than the inner gap; and at least one protective shield mounted on the substrate surface, and positioned entirely laterally apart from either of the conductive capacitor plates, and further positioned to limit rotation of the structure and thereby prevent the structure from contacting one of the conductive capacitor plates.

13. The accelerometer of claim 12, wherein the at least one protective shield is a pair of protective shields mounted on the substrate surface, a first protective shield from the pair being positioned to oppose the first region, and the second protective shield from the pair being positioned to oppose the second region.

14. The accelerometer according to claim 12, wherein the structure further comprises at least one stop that opposes, and protrudes toward, the protective shield.

15. The accelerometer according to claim 13, wherein the structure further comprises a first stop that opposes, and protrudes toward, the first protective shield, and a second stop that opposes, and protrudes toward, the second protective shield.

16. The accelerometer according to claim 12, wherein the at least one protective shield and the pair of conductive plates are formed from the same material.

17. The accelerometer according to claim 16, wherein the at least one protective shield and the pair of conductive plates are formed directly on the substrate surface.

18. The accelerometer according to claim 12, wherein each of the first and second structure regions further comprises at least one additional corrugation that is formed between the first corrugation and the outer surface, whereby between each additional corrugation and the opposing conductive plate an intermediate gap exists, each intermediate gap being larger than the inner gap and smaller than the outer gap.

19. The accelerometer according to claim 12, wherein from the inner gap to the outer gap, each successive intermediate gap increases in size.

* * * * *